(12) United States Patent
Budmiger

(10) Patent No.: US 8,271,946 B2
(45) Date of Patent: Sep. 18, 2012

(54) APPARATUS FOR OPERATING A PROCESS INSTALLATION

(75) Inventor: Thomas Budmiger, Ettingen (CH)

(73) Assignee: Endress + Hauser Flowtec AG, Reinach (CH)

( * ) Notice: Subject to any disclaimer, the term of this patent is extended or adjusted under 35 U.S.C. 154(b) by 718 days.

(21) Appl. No.: 12/084,113

(22) PCT Filed: Oct. 17, 2006

(86) PCT No.: PCT/EP2006/067516
§ 371 (c)(1),
(2), (4) Date: Jul. 29, 2009

(87) PCT Pub. No.: WO2007/048741
PCT Pub. Date: May 3, 2007

(65) Prior Publication Data
US 2009/0306796 A1    Dec. 10, 2009

(30) Foreign Application Priority Data
Oct. 27, 2005   (DE) .......................... 10 2005 051 769

(51) Int. Cl.
*G06F 9/44* (2006.01)
*G06F 9/45* (2006.01)
(52) U.S. Cl. ......... 717/120; 717/121; 717/131; 717/167
(58) Field of Classification Search .................... None
See application file for complete search history.

(56) References Cited

U.S. PATENT DOCUMENTS

| 7,070,272 | B1 | 7/2006 | Lu |
| 2002/0013629 | A1 | 1/2002 | Nixon |
| 2005/0060408 | A1* | 3/2005 | McIntyre et al. ............. 709/225 |

FOREIGN PATENT DOCUMENTS

| DE | 103 25 277 A1 | 1/2005 |
| GB | 2 403 043 A | 12/2004 |

OTHER PUBLICATIONS

Avisto PLC-NMS, http://www.avisto.com, TeleManagement Forum, May 24, 2006.

* cited by examiner

*Primary Examiner* — Chuck Kendall
(74) *Attorney, Agent, or Firm* — Bacon & Thomas, PLLC

(57) ABSTRACT

A set-up for operating a process installation. The set-up includes a control station and at least one field device, which determines or monitors at least one process variable. Each field device has a program memory, in which a boot-loader software is persistently implemented. The boot-loader software enables communication of the field device with the control station. A transmission link is provided, via which the control station and the field device, or field devices, communicate with one another during operation. Each field device transmits to the control station upon booting of the field device, via the transmission link, device-specific information. The control station transmits to the field device, after receipt of the device-specific information, application- and/or device-specific, measurement/control/evaluation software, which is matched to a particular application of the field device and which the field device stores in a data memory associated with it. The field device, based on application- and/or device-specific, measurement/control/evaluation software available to it during operation, makes available information concerning the process variable.

7 Claims, 2 Drawing Sheets

APPARATUS FOR OPERATING A PROCESS INSTALLATION

TECHNICAL FIELD

The invention relates to a set-up for operating a process plant. The set-up includes a control station and at least one field device for ascertaining or monitoring at least one process-variable.

BACKGROUND DISCUSSION

A field device is, in the normal case, an intelligent unit, composed of a sensor, which detects the pertinent process variable, and an integrated, or spatially remote, measurement transmitter, which makes available information concerning the process variable.

Often applied in process automation technology are field devices serving for registering and/or influencing process variables. Examples of such field devices include fill-level measuring devices, mass flow measuring devices, pressure- and temperature-measuring devices, pH-redox measuring devices, and conductivity measuring devices, which register the corresponding process-variables, fill-level, flow, e.g. flow rate, pressure, temperature, pH-value, conductivity, etc. Field devices for the most varied of applications are manufactured and sold by the Endress+Hauser.

Frequently, field devices are connected via a so-called fieldbus with a superordinated unit, e.g. a control station or a process control system. The superordinated control station serves for process visualizing, for process monitoring, for process control, as well as for servicing the field devices connected to the fieldbus. Examples of such fieldbusses include: CAN, CAN-OPEN, HART, Profibus PA, Profibus DP, Profibus FMS, Foundation fieldbus.

With the help of a fieldbus, it is possible, not only to transmit measured values of a field device to the central control unit, or control station. Thus, besides pure measured value transmission, field devices also enable transmission of various other kinds of information stored in the field device, information, such as, e.g., parameter-information (zero-point, measured value range, etc.), measurement curves and diagnostic information. Furthermore, the field devices are remotely serviced by the control station. For this, special hardware- and software-components are necessary, both in the field device as well as also in the control station.

In process control technology, development is moving in the direction of implementing in the field device always more functionalities, which relate, directly or indirectly, to the actual measuring- and monitoring-task of the field device; especially, a field device must be able to cover all special demands, which a customer has. These varied functionalities are performed by at least one microprocessor arranged in the field device. This microprocessor is, naturally, also responsible for its original purpose, i.e. for making available information concerning the process variable to be ascertained and monitored.

The growth of the functionality moved into the field device means, on the one hand, for the device manufacturer, an increased manufacturing- and developmental effort; and, for the user, it means, on the other hand, an increased administrative effort. Thus, for both participants, higher costs arise. Especially, the associated schooling effort and the number and size of handbooks become quite significant. Yet, it is to be noted, that an individual user needs, as a rule, usually only a fraction of the available functionalities of a field device for the user's particular application.

Disclosed in DE 103 25 277 A1 is a variable field device for process control technology. In this case, the device is connected to an external communications medium for the purpose of data transmission, and its functionalities are adaptable application-specifically. While the field device still only provides the basic functions, e.g. measured value production, application-specific functionalities, such as e.g. providing frequency/pulse outputs, are implemented by separate functional units, with the field devices and the separate functional units exchanging data via the communications medium. The communications medium is e.g. a two-wire line. The functional unit is, for example, an externally connectable, operating, or servicing, tool.

The solution of the state of the art makes the field device very variable and application-specifically adaptable. Especially, it has only the functionalities that it needs. Also, servicing such a field device is exceptionally easy, since it has only the user-required functions. Furthermore, transparency of the measured-value further-processing is provided for the user. The field device delivers a measured value, which is further-processed in the appropriate functional units. Through its simple construction, the variable field device is very cost-favorable as regards its manufacture and handling.

SUMMARY OF THE INVENTION

An object of the invention is to provide a set-up, in which a field device is automatically provided only with the information required for its particular application.

The object is achieved by the features that: each field device contains a program/data memory, in which a boot-loader software is persistently implemented, wherein the boot-loader software enables communication of the field device with a control station; in each case, a transmission link is provided, via which the control station and the field device, or field devices, communicate with one another during operation; each field device, upon its booting, transmits device-specific information via the transmission link to the control station; the control station, upon receipt of the device-specific information, transmits to the field device, application- and/or device-specific measurement/control/evaluation software, which is matched to the particular application of the field device and which the field device stores in a data memory associated with it; and the field device, in accordance with the application- and/or device-specific measurement/control/evaluation software available to it during operation, makes available information concerning the process variable.

The set-up of the invention is distinguished by the fact that it is, on the one hand, cost-favorable; on the other hand, the invention enables a significant simplification as regards maintenance work at the process installation. If, for example, new software is to be implemented in the field device for providing the measurement data or for a new application, this happens automatically upon turning the field device on, that is, upon the booting of the field device. The same situation also holds for the inputting of updated calibration- or parametering-data, which are transmitted to the field device from the superordinated control station automatically upon the starting of measurement operation of such field device.

In an advantageous further development of the set-up of the invention, the transmission link is embodied as a digital data line. Alternatively, another option is to provide, that the transmission link is a radio connection.

A preferred embodiment of the set-up of the invention provides, that the program memory for the boot-loader software is a non-volatile memory, while the program/data memory is embodied as volatile memory. Moreover, as already mentioned above, an option includes that the application- and/or device-specific measurement/control/evaluation software is calibration data and/or parameter data.

In an advantageous embodiment of the set-up of the invention, the control station transmits via the transmission link, when required, a command, which automatically starts the booting of the field device, i.e. the field device is forced to reset and then newly started.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
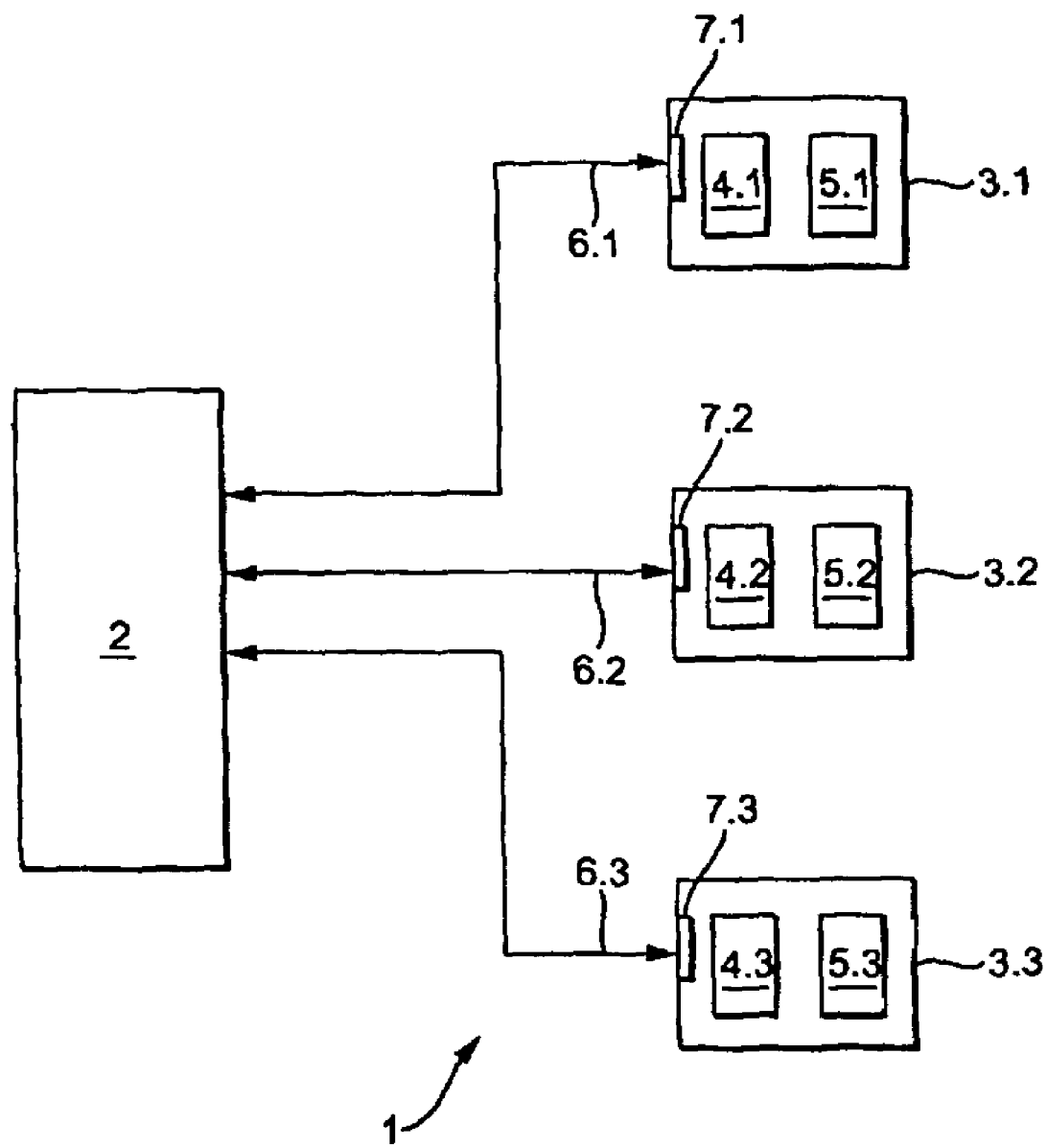
FIG. 1 a schematic drawing of a first form of embodiment of the set-up of the invention.

FIG. 1 is a schematic drawing of a first form of embodiment of the set-up of the invention. The control station 2 is connected with the field devices 3.1, 3.2, 3.3 via the transmission links 6.1, 6.2, 6.3. Via the transmission links 6.1, 6.2, 6.3, the data-exchange is accomplished between the control station 2 and the field devices 3.1, 3.2, 3.3. In the illustrated case, the communication is accomplished preferably via radio. Corresponding radio interfaces 7.1, 7.2, 7.3 are provided at the field devices 3.1, 3.2, 3.3 and at the control station 2.

Figure 2:
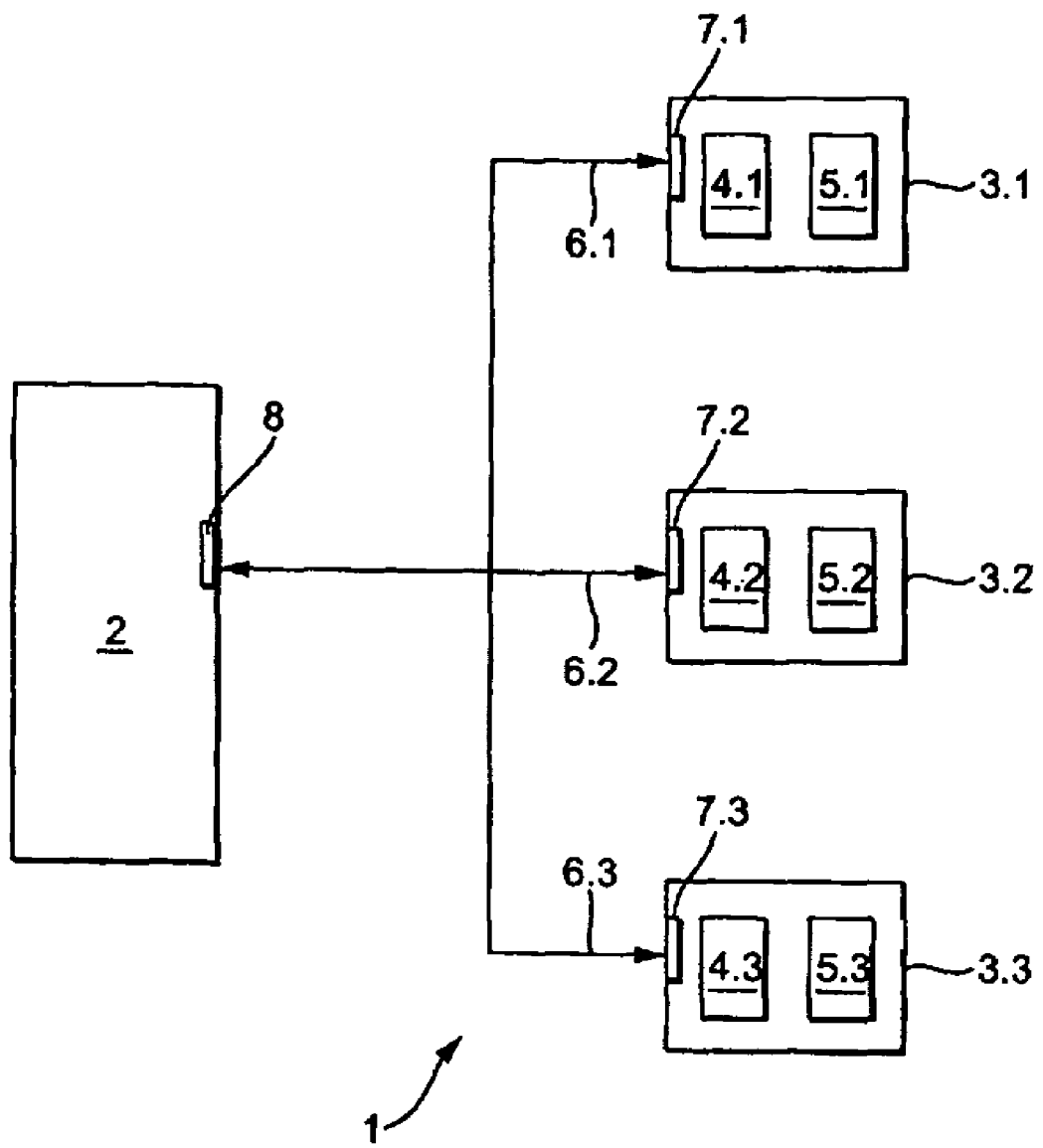
FIG. 2 a schematic drawing of a second form of embodiment of the set-up of the invention.

In the case of the embodiment of the set-up of the invention shown in FIG. 2, the field devices 3.1, 3.2, 3.3 communicate via wired, digital, data lines, or via a fieldbus working according to one of the following protocols: CAN, CAN-OPEN, HART, Profibus PA, Profibus DP, Profibus FMS, Foundation fieldbus.

Each field device 3.1, 3.2, 3.3 has a program memory 4.1, 4.2, 4.3 and a data memory 5.1, 5.2, 5.3, wherein, in each program memory 4.1, 4.2, 4.3, a boot-loader software is persistently implemented and enables communication of the field device 3.1, 3.2, 3.3 with the control station. Upon booting of the field device 3.1, 3.2, 3.3, the field device 3.1, 3.2, 3.3 transmits, via the transmission link 6.1, 6.2, 6.3, device-specific information, for instance information in the nature of an identifier of the field device, to the control station 2. In return, the control station 2 transmits to the field device 3.1, 3.2, 3.3, following receipt of the device-specific information, application- and/or device-specific, measurement/control/evaluation software matching the particular application of the field device 3.1, 3.2, 3.3. This, the field device 3.1, 3.2, 3.3 temporarily stores in the data memory 5.1, 5.2, 5.3 associated with it. During subsequent operation, the field device 3.1, 3.2, 3.3 operates on the basis of the application- and/or device-specific measurement/control/evaluation software specially matched to its task and makes available information concerning the process variable measured or monitored by it. Since the field device 3.1, 3.2, 3.3, upon every booting, automatically receives quasi tailor-made, measurement/control/evaluation software updated and optimally matched to its particular measurement task, the set-up of the invention operates highly effectively.

As already mentioned above, it is, furthermore, provided, that the control station 2 sends via the transmission link 6; 6.1, 6.2, 6.3, when required, e.g. after an update of the measurement/control/evaluation software has been transmitted to the control station 2, a command to a field device 3.1, 3.2, 3.3 forcing the field device 3.1, 3.2, 3.3 to reset and then re-boot. The measurement/control/evaluation software is loaded into the control station 2 via an operating tool; another option, however, is, for example, to input an update via Internet.

The invention claimed is:

1. A set-up for operating a process plant, which set-up comprises:
    a control station;
    at least one field device, which ascertains or monitors at least one process variable, each field device having a data memory and a program memory, in which a boot-loader software is persistently implemented, said boot-loader software enables communication of said at least one field device with said control station; and
    a transmission link, via which said control station and said at least one field device, or field devices, communicate with one another during operation, wherein:
    each field device transmits, upon booting of the field device, via said transmission link, device-specific information to said control station;
    said control station transmits to said at least one field device, after receipt of the device-specific information, application- and/or device-specific, measurement/control/evaluation software, which is matched to a particular application of the field device and which the field device stores in said data memory associated with the field device; and
    said at least one field device makes available, based on application- and/or device-specific, measurement/control/evaluation software available to it during operation, information concerning the process variable.

2. The set-up as claimed in claim 1, wherein:
said transmission link is embodied as a digital, data line.

3. The set-up as claimed in claim 1, wherein:
said transmission link is a radio connection.

4. The set-up as claimed in claim 1, wherein:
said program memory is a non-volatile memory.

5. The set-up as claimed in claim 1, wherein:
said data memory is a volatile memory.

6. The set-up as claimed in claim 1, wherein:
said application- and/or device-specific, measurement/control/evaluation software comprises calibration data and/or parameter data.

7. The set-up as claimed in claim 1, wherein:
said control station transmits via said transmission link a command, with which booting of said at least one field device is started.

* * * * *